United States Patent [19]
Ohta et al.

[11] Patent Number: 4,985,885
[45] Date of Patent: Jan. 15, 1991

[54] OPTICAL MEMORY DEVICE

[75] Inventors: Kenji Ohta; Akira Takahashi; Hiroyuki Katayama; Junji Hirokane, all of Nara; Yoshiteru Murakami, Nishinomiya, all of Japan

[73] Assignee: Sharp Kabushiki Kaisha, Osaka, Japan

[21] Appl. No.: 213,817

[22] Filed: Jun. 30, 1988

[30] Foreign Application Priority Data

Jul. 1, 1987 [JP] Japan ................. 62-164443
Jul. 1, 1987 [JP] Japan ................. 62-164444

[51] Int. Cl.⁵ .............................. G11B 7/24
[52] U.S. Cl. ..................... 369/275.1; 428/692; 428/694
[58] Field of Search ............. 365/122; 360/114, 131, 360/132, 133, 135; 369/13, 275, 53–58, 275.1; 428/694, 692, 900

[56] References Cited

U.S. PATENT DOCUMENTS 4,489,139 12/1984 Ohta et al. ............ 428/694 X
4,562,105 12/1985 Machida et al. ........... 365/122 X

FOREIGN PATENT DOCUMENTS 0105374 8/1983 European Pat. Off. .
0145344 6/1985 European Pat. Off. .
2643464 12/1977 Fed. Rep. of Germany .

OTHER PUBLICATIONS

Patent Abstracts of Japan 6(75):114, (May 12, 1982).
Patent Abstracts of Japan 11(208):593, (Jul. 7, 1987).
Patent Abstracts of Japan 11(137):572, (May 2, 1987).

Primary Examiner—Robert L. Richardson
Attorney, Agent, or Firm—Irell & Manella

[57] ABSTRACT

An optical memory device comprising a first light-permeable substrate, a second light-permeable substrate and a plurality of strip-shaped optical recording layers that are disposed with a gap between the first substrate and the second substrate, wherein the optical path length from the outer surface of the first substrate to the recording layers is approximately equal to the optical path length from the outer surface of the second surface to the recording layers.

5 Claims, 3 Drawing Sheets

OPTICAL MEMORY DEVICE

BACKGROUND OF THE INVENTION

1. Field of the invention

This invention relates to an optical memory device that conducts a recording operation, a reading operation, or an erasing operation of information by means of light beams, and to an optical memory apparatus with the said optical memory device.

2. Description of the prior art

In recent years, optical memory devices have come to public notice as a high density and high capacity memory device, which conducts a recording operation, a reading operation, or an erasing operation of information by means of light beams from semiconductor lasers or the like. An optical element (i.e., an optical pickup) that is composed of the above-mentioned semiconductor lasers, optical lenses for converging light beams from the semiconductor lasers so as to illuminate the optical memory device, photodetectors for detecting light reflected by the optical memory device, and so on must be moved at a high speed in a two-dimensional manner with regard to the said optical memory device, which causes difficulties in the positioning of the said optical element with high accuracy.

To overcome this problem, the above-mentioned optical memory device is generally formed into a disk, which is moved in one-dimensional manner in the radial direction thereof while the disk is turning around its axis, thereby attaining a recording operation, a reading operation, or an erasing operation of information on the disk.

Such a disk-shaped optical memory device comprises, as shown in FIG. 5, a disk-shaped substrate 13 that has a plurality of guide grooves 12 on one surface thereof, and a recording layer 14 that is disposed on the groove-side substrate 12. The other surface of the substrate 13 is irradiated with light beams 15 from a semiconductor laser (not shown) so as to achieve a recording operation, a reading operation, or an erasing operation of information. The optical memory device with the above-mentioned structure is advantageous in that the optical element can be arranged only on one side of the optical memory disk, which results in a miniaturized and lightweight optical element and which makes easy the movement of the optical element in the radial direction of the optical memory disk.

FIG. 6 shows another conventional diskshaped optical memory device, which is produced by sandwiching an adhesive layer 16 between a pair of optical memory disks of FIG. 5 in such a manner that the recording film 14-side surface of one disk faces that of the other disk through the adhesive layer 16. This optical memory device is advantageous in that both outer surfaces of the disks are irradiated with light beams 15, and accordingly the amount of information to be recorded is doubled. However, it is difficult for operators to recognize which is the front surface or the back surface of the optical memory disk at the time of the application of the disk to an optical memory apparatus. If the front surface (or the back surface of the disk is wrongly recognized to be the back surface (or the front surface) thereof, the disk will have to be removed from the optical memory apparatus and again installed into the apparatus so that the correct surface of the disk can face the optical element. The same problem arises in the optical memory device shown in FIG. 5 because the front surface of the disk is indistinguishable from the back surface of the disk.

To overcome this problem, optical pickups are disposed on both the front surface and the back surface of the disk, respectively. These optical pickups are very expensive, and moreover they make the optical memory apparatus large.

SUMMARY OF THE INVENTION

The optical memory device of this invention, which overcomes the above-discussed and numerous other disadvantages and deficiencies of the prior art, comprises a first light-permeable substrate, a second light-permeable substrate and a plurality of strip-shaped optical recording layers that are disposed with a gap between the first substrate and the second substrate, wherein the optical path length from the outer surface of said first substrate to said recording layers is approximately equal to the optical path length from the outer surface of said second surface to said recording layers.

The optical memory device of this invention can further comprise a first light-permeable inorganic layer and a second light-permeable inorganic layer that are disposed between said first substrate and said adhesive layer, said recording layers being disposed between said first and second light-permeable inorganic layers.

The optical memory apparatus of this invention comprises the above-mentioned optical memory device, a motor for turning said optical memory device around its axis in the forward and backward directions, an optical element that is disposed to face one of the surfaces of said optical memory device, a detecting means for detecting as to which surface of said optical memory device faces said optical element, and a regulating means for regulating the turning direction of said optical memory device according to signals from said detecting means.

Thus, the invention described herein makes possible the objectives of (1) providing an optical memory device that conducts a recording operation, a reading operation, or an erasing operation of information as soon as it is installed into an optical memory apparatus regardless of the kind of surfaces (i.e., the front surface or the back surface) of the disk; (2) providing an optical memory device in which the recording layer is formed into circular or spiral narrow strips so that thermal energy absorbed by the said strip-shaped recording layer can be liberated in the strip direction alone, which makes small the amount of laser light needed for the recording of information; (3) providing a miniaturized and lightweight optical memory device that is especially useful at the time when the installation thereof into and the removal thereof from the optical memory apparatus are frequently carried out; (4) providing an optical memory apparatus with the above-mentioned optical memory device in which a recording operation, a reading operation, or an erasing operation of information can be conducted as soon as the optical memory device is installed into the said apparatus regardless of the kind of surfaces of the memory device; and (5) providing an optical memory apparatus in which an optical pickup that is very expensive is disposed on only one surface of the optical memory device, which allows the said apparatus to be miniaturized and lightweight.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
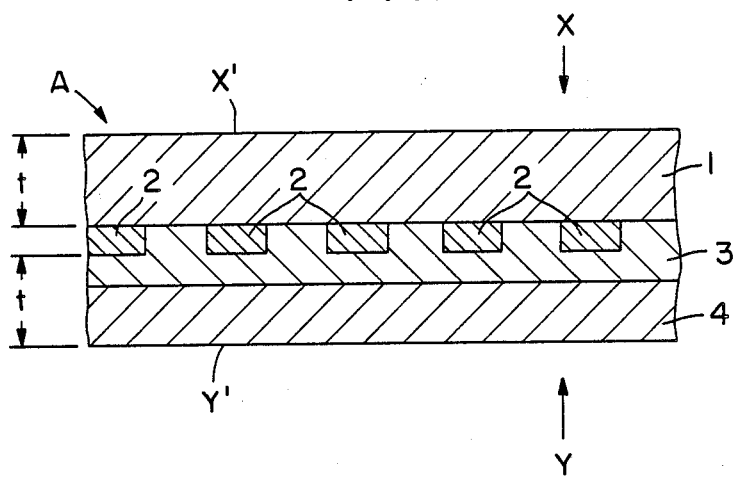
FIG. 1 is a sectional view showing an optical memory device of this invention.

FIG. 1 shows an optical memory device A of this invention, which comprises a first light-permeable substrate 1, a plurality of strip-shaped magneto-optic recording layers 2 that are disposed with a given gap therebetween on the inner surface of the substrate 1, a light-permeable adhesive layer 3 that is disposed on the said inner surface of the substrate 1 including the recording layers 2, and a second light-permeable substrate 4 that is disposed on the adhesive layer 3. The light-permeable substrates 1 and 4 can be made of transparent or semitransparent materials. The recording layer 2 is made of GdTbFe, TbFeCo, GdNbFeCo, NdDyFeCo, MnBi, MnBiCu, or the like and has a magnetizable axis in the direction that is vertical to the light-permeable substrate 1. The recording layers 2 function as guide tracks of light beams.

The thickness of the recording layer 2 is preferably set in a certain range. When the thickness of the recording layer 2 is exceedingly thin, light that comes into the recording layer permeates the recording layer so that the magneto-optical effect of the recording layer 2 becomes small and/or the amount of light reflected by the recording layer becomes small and the recording layer cannot function as a guide track. When the thickness of the recording layer 2 is exceedingly thick, the magnetic characteristics of the recording layer 2 cannot be sufficiently changed in the thickness direction of the recording layer 2 at the time of irradiation of the recording layer 2 with light beams. As a result, the signal-reading characteristics of the recording layer 2 in the direction of arrow X become different from those of the recording layer 2 in the direction of arrow Y. For these reasons, the thickness of the recording layer 2 is set at a certain level. When the recording layer 2 is made of rare earth transition metals, the thickness thereof is preferably set in the range of about 50 Å to 1500 Å. The adhesive layer 3 is made of a UV curing-type material.

The thickness t of the substrate 1 is set to be the same as the total thickness t of the thickness of the substrate 4 and the thickness of the adhesive layer 3 that excludes the thickness of the recording layer 2, so that the optical path length in the thickness direction of the substrate 1 becomes equal to the optical path length in the thickness direction of the substrate 4. Accordingly, the optical path length at the time when light beams converged from semiconductor laser or the like are incident upon the substrate 1 in the arrow X direction is nearly equal to that at the time when light beams converged from the semiconductor laser or the like are incident upon the substrate 4 in the arrow Y direction, and thus the diameter of the converged light beam spot formed on one surface of the optical memory device A is equal to that of the converged light beam spot formed on the other surface of the optical memory device A without being influenced by the lens aberration of an optical system by which light beams from the semiconductor laser or the like are converged and introduced into the optical memory device A.

The strip recording layers 2 can be formed into concentric circles or spirals. It is also possible for them to be formed into dots on virtual concentric circles or spirals so that the address signals indicating the sector or track to which the dots belong can be recognized. Moreover, although the above-mentioned example only discloses magneto-optic recording layers as recording layers constituting the optical memory device A, this invention is applicable to recording layers (e.g., TeOx layers), the transmittance or reflectivity of which varies depending upon the thermal energy of light illuminating the recording layers.

The optical memory device A has no limited outer diameter, but it is preferably set to a small outer diameter, e.g., 3.5 inches, 5.25 inches, or the like.

EXAMPLE 2

Figure 2:
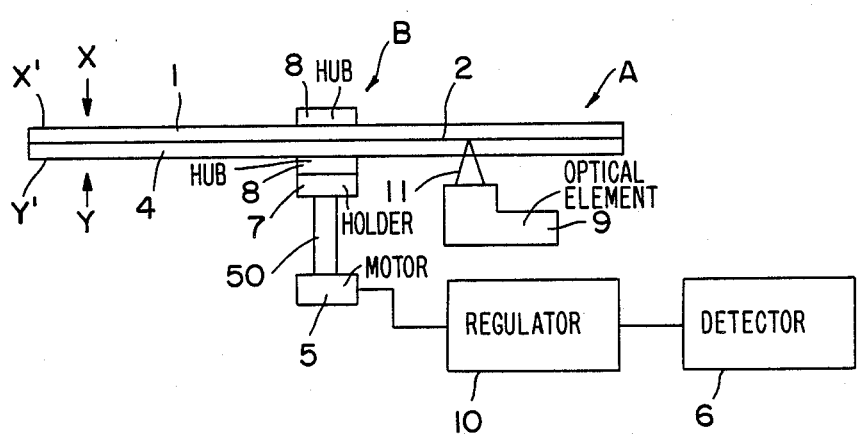
FIG. 2 is a schematic diagram showing an optical memory apparatus of this invention with the optical memory device of FIG. 1.

FIG. 2 shows an optical memory apparatus B of this invention, which comprises the above-mentioned optical memory device A, a motor 5 for turning the optical memory device around its axis in the forward and backward directions, an optical element 9 that is disposed to face one of the surfaces of the optical memory device A, a detecting means 6 for detecting as to which surface of the optical memory device A faces the optical element 9, and a regulating means 10 for regulating the turning direction of the optical memory device A according to signals from the detecting means 6.

The optical memory device A is fixed to the output shaft 50 of the motor 5 by means of a holder 7 that has a magnet (not shown) and a pair of hubs 8 that are made of a magnetic substance in such a manner that the optical memory device A is sandwiched between the pair of hubs 8 in the center of the optical memory device A. The holder 7 is fixed to one hub 8 by magnetic force. The optical element 9 comprises, for example, a light-emitting means such as a semiconductor laser or the like, lenses for converging the light beams from the light-emitting means and irradiating the optical memory device A, and a photodetector for detecting the amount of light reflected by the optical memory device A. The optical element 9 is movable in the radial direction of the optical memory device A.

The detecting means 6 that distinguishes one surface of the optical memory device A from the other is not limited to a specific structure. In the cases where the optical memory device A is held within a cartridge holding the optical memory device A therein is designed so that it can be installed into the optical memory apparatus B as it is, the outer shape of the front surface of the cartridge is different from that of the back surface of the cartridge, and this difference between the front surface and the back surface of the cartridge is detected by the detecting means 6.

The regulating means 10 regulates the turning direction of the optical memory device A according to signals from the above-mentioned detecting means 6.

Thus, as shown in FIG. 2, when the optical memory device A is held by the shaft 50 of the motor 5 by means of the holder 7 and the hubs 8 in such a manner that its back surface Y' faces the optical element 9, the detecting means 6 detects that the back surface Y' of the optical memory device A faces the optical element 9. The regulating means 10 regulates the turning direction of the motor 5, resulting in the turn of the output shaft 50 of the motor 5 in a given direction. Thereafter, the back surface Y' of the optical memory device A is irradiated with light beams 11 from the optical element 9 through lenses (not shown), and the tracking-servocontrol of the optical element is carried out based on signals from the guide tracks of the magneto-optic recording layers 2, thereby attaining a recording operation, a reading operation, or an erasing operation of information.

When the optical memory device A is held by the output shaft 50 of the motor 5 in such a manner that its front surface X' faces the optical element 9, the detecting means 6 detects so, and the regulating means 10 regulates the turning direction of the motor 5, which results in the turn of the output shaft 50 of the motor 5 in the direction opposite to the above-mentioned direction. Thereafter, in the same way as mentioned above, a recording operation, a reading operation, or an erasing operation of information is attained.

Although the above-mentioned example discloses a reflection-type optical memory apparatus B in which light beams from the optical element 9 are reflected by the optical memory device A, and based on signals from the guide tracks of the optical memory device A, the tracking servocontrol of the optical element 9 can be carried out, this invention is, of course, applicable to a light permeation-type optical memory apparatus in which a photodetector is disposed on the side opposite to the optical element 9 (FIG. 2) with regard to the optical memory device A.

EXAMPLE 3

Figure 3:
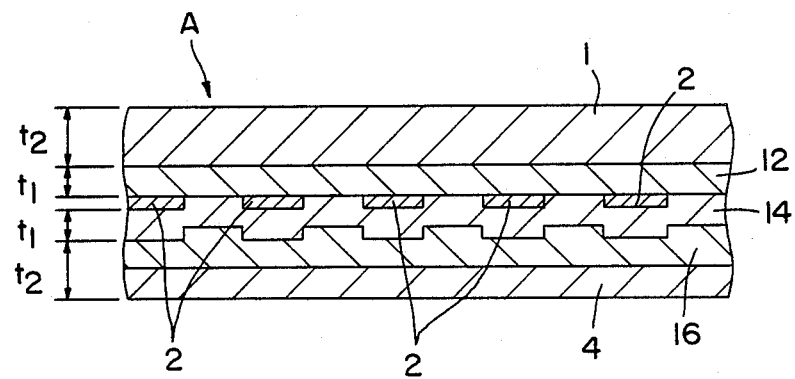
FIG. 3 is a sectional view showing another optical memory device of this invention.

FIG. 3 shows another optical memory device A of this invention, which comprises a first light-permeable substrate 1, a first light-permeable inorganic layer 12, magneto-optic recording layers 2, a second light-permeable inorganic layer 14, an adhesive layer 16, and a second light-permeable substrate 4 in that order. The light-permeable substrates 1 and 4 and the light-permeable inorganic layers 12 and 14 can be made of transparent or semitransparent materials. The substrates 1 and 4 are made of polycarbonate, acrylic resin, polyolefin, or the like and have a thickness of about 0.3–1.5 mm each. The inorganic layers 12 and 14 are made of nitrides such as aluminum nitride, silicon nitride, tantalum nitride or the like; oxides such as alumina, silicon oxide or the like; or inorganic substances containing any one of these materials as the main component. The thickness $t_1$ of the inorganic layer 12 is the same as that of the inorganic layer 14, ranging from about 500 to 2000 Å. The recording layers 2 are made of the same materials as described in Example 1, the thickness of which is also the same as that of Example 1. The recording layers 2 are also formed in the same shape as that of Example 1. The adhesive layer 16 is made of a UV curing-type material.

The refraction indexes of the inorganic layers 12 and 14, about 1.8–2.0, are preferably more than those of the substrates 1 and 4. When the thickness of each of the inorganic layers 12 and 14 is set to be about 800–1200 Å, the Kerr-rotation angle of the recording layers 3 increases, resulting in regenerated signals with an improved quality. Moreover, it is preferable that the refraction index of the adhesive layer 16 is approximately equal to that of the substrate 4 that adheres to the said adhesive layer 16. The total thickness $t_2$ of the adhesive layer 16 and the substrate 4 is preferably the same as the thickness $t_2$ of the substrate 1, whereby the optical path length from the top surface of the substrate 1 to the recording layers 3 becomes equal to that from the top surface of the substrate 4 to the recording layers 2.

Figure 4A:
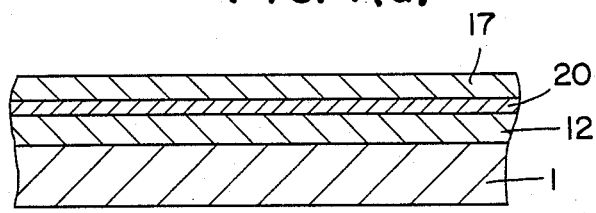
FIGS. 4a to 4d are schematic diagrams showing a production process of the optical memory device shown in FIG. 3.
Figure 4B:
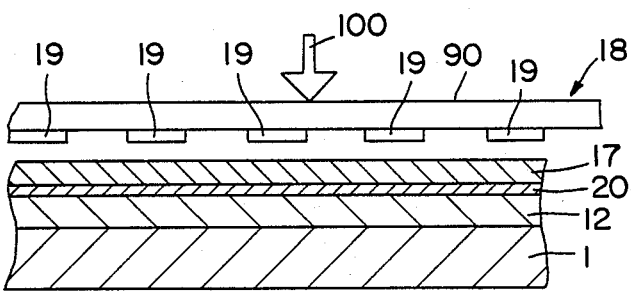
Figure 4C:
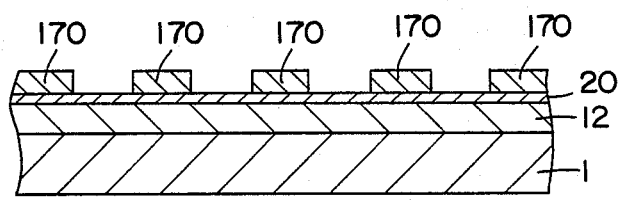
Figure 4D:
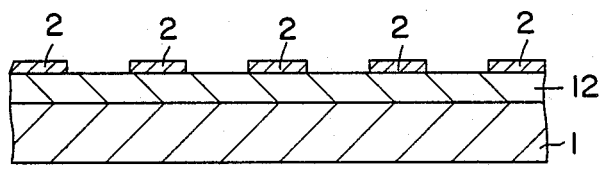
Figure 5:
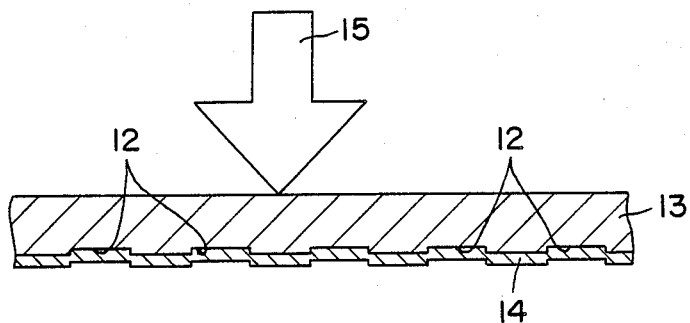
FIGS. 5 and 6, respectively, are sectional views showing conventional optical memory devices.
Figure 6:
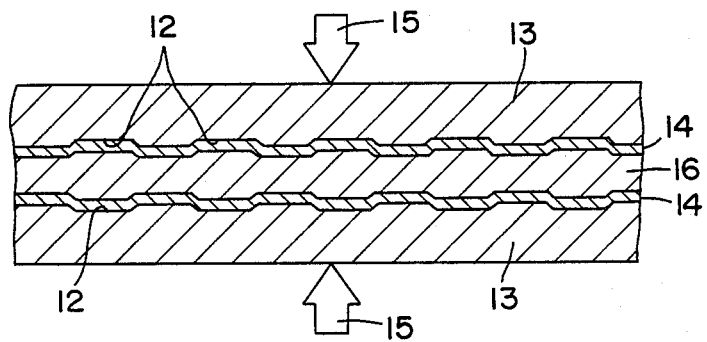

The optical memory device A mentioned above is produced as follows: The substrate 1 is washed with water and other cleaning agents. Then, as shown in FIG. 4a, the inorganic layer 12 is formed on the substrate 1 by vacuum evaporation, chemical vapor deposition, the sputtering method, or the like, after which a recording layer 20 is formed on the inorganic layer 12 by vacuum evaporation, the sputtering method, or the like. On the recording layer 20, a resist layer 17 is formed by a coating technique and baked, followed by exposing the resist layer 17 to ultraviolet rays 100, as shown in FIG. 4b, through a mask 18 that is made from a light-permeable plate 90 of quartz or the like with opaque strip-layers 19 of Ta, Ti, Cr or the like. Then, the resist layer 17 is developed, resulting in resist strips 170 as shown in FIG. 4c. Then, the recording layer 20 is etched by a dry etching technique within a gas of $CF_4$ or the like or an wet etching technique using an acid or alkaline solution, and the resist strips 170 are removed, resulting in strip-shaped recording layers 2 that constitute guide tracks as shown in FIG. 4d.

Thereafter, on the, inorganic layer 12 including the recording layers 3, as shown in FIG. 3, the inorganic layer 14 is laminated, on which the adhesive layer 16 and the substrate 4 are then laminated in that order, resulting in an optical memory device A. The resist layer 17 can be of either a negative-type or a positive-type. The shape of the optical memory device A is not limited to a disk shape, but it can be a non-disk shape. The optical memory device A is especially useful when it has a small outer diameter, e.g., 3.5 or 5.25 inches. Although the above-mentioned example only discloses magneto-optic recording layers as recording layers constituting the optical memory device A, this invention is applicable to recording layers (e.g., semimetal layers containing Te or the like), the transmittance or reflectivity of which varies depending upon the thermal energy of light illuminating the recording layers.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical memory device comprising a first light-permeable substrate, a second light-permeable substrate and at least one strip-shaped optical recording layer that is disposed within a gap between the first substrate and the second substrate, wherein the optical path length from the outer surface of said first substrate to said recording layer is approximately equal to the optical path length from the outer surface of said second surface to said recording layer.

2. An optical memory device according to claim 1, which further comprises a first light-permeable inorganic layer, a second light-permeable second light-permeable inorganic layers being disposed between said first substrate and said adhesive layer, said recording layer being disposed between said first and second light-permeable inorganic layers.

3. An optical memory apparatus with an optical memory device, comprising a motor for turning said optical memory device around its axis in the forward and backward directions, an optical element that is disposed to face one of the surfaces of said optical memory device, a detecting means for detecting as to which surface of said optical memory device faces said optical element, and a regulating means for regulating the turning direction of said optical memory device according to signals from said detecting means,
   wherein said optical memory device comprises a first light-permeable substrate, a second light-permeable substrate and at least on strip-shaped optical recording layer that is disposed within a gap between the first substrate and the second substrate, wherein the optical path length from the outer surface of said first substrate to said recording later is approximately equal to the optical path length from the outer surface of said second surface to said recording layer.

4. An optical memory apparatus with an optical memory device, comprising a motor for turning said optical memory device around its axis in the forward and backward directions, an optical element that is disposed to face one of the surfaces of said optical memory device, a detecting means for detecting as to which surface of said optical memory device faces said optical element, and a regulating means for regulating the turning direction of said optical memory device according to signals from said detecting means,
   wherein said optical memory device comprises:
      a first light-permeable substrate;
      a second light permeable substrate;
      at least one strip-shaped optical recording layer that is disposed within a gap between the first substrate an the second substrate, wherein the optical path length from the outer surface of said first substrate to said recording layer is approximately equal to the optical path length from the outer surface of said second surface to said recording layer, and wherein an adhesive layer disposed between said first and second light-permeable substrates in addition to said recording layer; said optical memory device further comprising:
      a first light-permeable inorganic layer;
      a second light-permeable inorganic layer; and
      an adhesive layer, said first and second light-permeable inorganic layers being disposed between said first substrate and said adhesive layer, said recording layer being disposed between said first and second light-permeable inorganic layers.

5. An optical memory device according to claim 1, wherein an adhesive layer is disposed between said first and second light-permeable substrates, in addition to said recording layer.

* * * * *